US009043253B2

(12) United States Patent
Sreedharan

(10) Patent No.: US 9,043,253 B2
(45) Date of Patent: May 26, 2015

(54) OPTIMIZATION TO IDENTIFY NEAREST OBJECTS IN A DATASET FOR DATA ANALYSIS

(71) Applicant: Unmesh Sreedharan, Kottayam (IN)

(72) Inventor: Unmesh Sreedharan, Kottayam (IN)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 276 days.

(21) Appl. No.: 13/671,535

(22) Filed: Nov. 7, 2012

(65) Prior Publication Data

US 2014/0129984 A1 May 8, 2014

(51) Int. Cl.
G06F 3/048 (2013.01)
G06N 99/00 (2010.01)
G06F 17/30 (2006.01)

(52) U.S. Cl.
CPC .............. *G06F 3/048* (2013.01); *G06N 99/005* (2013.01); *G06F 17/30* (2013.01)

(58) Field of Classification Search
CPC ...... G06F 3/048; G06N 99/005; G06N 3/004; G06N 3/0436; G06N 3/086
USPC .......... 455/456.2, 127.1; 370/395.64; 706/12, 706/14; 715/817
See application file for complete search history.

(56) References Cited

U.S. PATENT DOCUMENTS

2013/0024159 A1* 1/2013 Ghoting et al. ............... 702/179

OTHER PUBLICATIONS

Lee E. et al., "Fast Design of Reduced-Complexity Nearest-Neighbor Classifiers Using Triangular Inequality", IEEE Transactions on Pattern Analysis and Machine Intelligence, vol. 20, No. 5, May 1998, pp. 562-566.*
Liang S. et al., "Design and Evaluation of a Parallel K-Nearest Neighbor Algorithm on CUDA-enabled GPU", IEEE 2nd Symposium on Web Society (SWS), 2010, pp. 53-60.*
Edwin M. Knorr, Raymond T. Ng, Vladimir Tucakov; Distance-based outliers: algorithms and applications; The VLDB Journal—The International Journal on Very Large Data Bases; Feb. 3-4, 2000; Page No. 237-253; vol. 8; Springer-Verlag, New York, Inc. Secaucus, NJ, USA; (http://dx.doi.org/10.1007/s007780050006).

(Continued)

*Primary Examiner* — Jeffrey A Gaffin
*Assistant Examiner* — Dave Misir

(57) ABSTRACT

In one embodiment, a plurality of objects associated with a dataset and a specified number of nearest objects to be identified are received. The received objects are sorted in a structured format. Further, a key object and a number of adjacent objects corresponding to the key object are selected from the sorted plurality of objects, wherein the number of adjacent objects is selected based on the specified number of nearest objects to be identified. Furthermore, distances between the key object and the number of adjacent objects are determined to identify the specified number of nearest objects, wherein the distances are determined until the specified number of nearest objects is identified. Based on the determined distances, the specified number of nearest objects in the dataset is identified for data analysis.

14 Claims, 6 Drawing Sheets

(56) References Cited

OTHER PUBLICATIONS

Edwin M. Knorr, Raymond T. Ng; Algorithms for Mining Distance-Based Outliers in Large Datasets; Proceedings of the 24rd International Conference on Very Large Data Bases (VLDB '98), Aug. 24-27, 1998; Page No. 392-403; Morgan Kaufmann Publishers Inc., San Francisco, CA, USA; (http://dl.acm.org/citation.cfm?id=671334).

Ke Zhang, Marcus Nutter, Huidong Jin; A New Local Distance-Based Outlier Detection Approach for Scattered Real-World Data; Advances in Knowledge Discovery and Data Mining; Proc. 13th Pacific-Asia Conf. on Knowledge Discovery and Data Mining (PAKDD 2009); Mar. 18, 2009; Page No. 813-822; Springer, Berlin-Heidelberg, Germany; (http://arxiv.org/abs/0903.3257).

\* cited by examiner

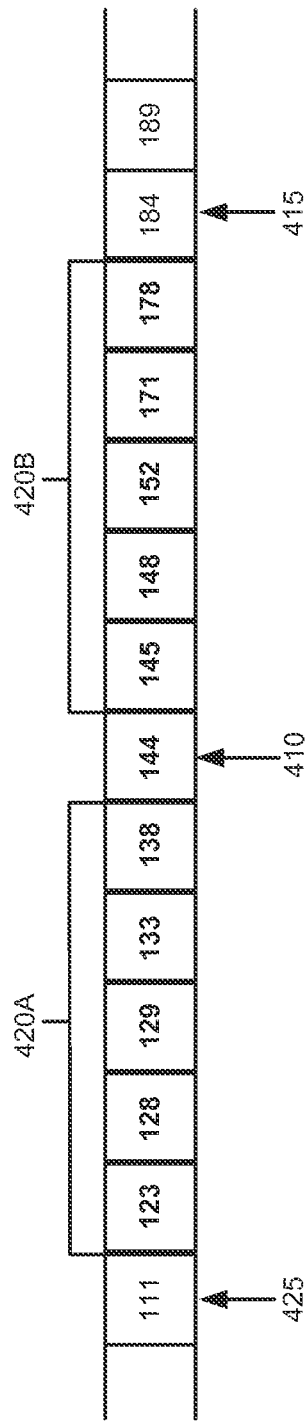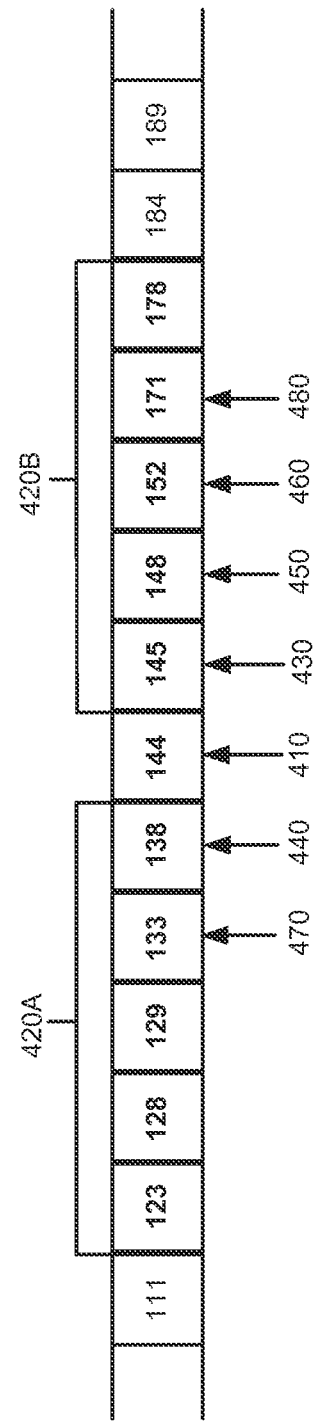

OPTIMIZATION TO IDENTIFY NEAREST OBJECTS IN A DATASET FOR DATA ANALYSIS

FIELD

Embodiments generally relate to data analysis and more particularly to methods and systems to optimize identification of objects with nearest degree of affinity in a dataset.

BACKGROUND

Data analysis, a process of analyzing data from different perspectives and summarizing it into useful information, facilitates an organization in understanding and interpreting the data. For instance, data is analyzed by grouping objects in a dataset into groups (e.g., clustering objects), detecting one or more outliers to the group (e.g. anomaly detection), and the like. Some of the techniques used to analyze data are from data mining, pattern recognition, machine learning, and the like. One technique from machine learning is the K-Nearest Neighbor (KNN) algorithm. In the KNN algorithm, the affinity or closeness of the objects in the dataset is determined. The affinity is also known as distance in a feature space between objects in the dataset. Further, based on the determined distances, the objects are clustered and the outlier is detected for data analysis.

Specifically, the KNN algorithm is technique to find distance-based outliers based on the distance of an object from its $k^{th}$-nearest neighbors in the feature space. Each object is ranked on the basis of its distance to its $k^{th}$-nearest neighbors. The farthest away object is declared the outlier. In some cases the farthest objects are declared outliers. That is, an object in a data set is an outlier with respect to parameters, such as, a k number of neighbors and a specified distance, if no more than k objects in the data set are at the specified distance or less from the object. As well the KNN is a classification technique that uses supervised learning. An item is presented and compared to a training set with two or more classes. The item is assigned to the class that is most common amongst its k-nearest neighbors. That is, compute the distance to all the items in the training set to find the k nearest, and extract the majority class from the k and assign to item. However, the technique to find the nearest neighbors based on the distance can be computationally intensive as it requires calculation of the distance of objects under consideration to every other object in the dataset and ordering of them by the distance with the lowest distance first. This may affect the performance of a computer system, especially when the dataset is large, in terms of memory and processing time complexity.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIGS. 4A to 4D are exemplary datasets illustrating the method described in FIGS. 1 and 2, according to an embodiment.

DETAILED DESCRIPTION

Embodiments of techniques to optimize identification of nearest objects corresponding to a key object in a dataset for data analysis are described herein. According to various embodiments, the dataset includes objects associated with one or more attributes. For example, the objects can be numbers. The objects represent numeral values of the attribute, such as, but are not limited to objects pertaining to salary packages of employees and number of projects associated with each employee. An object can be associated with two more numerical values, for example, a color expressed as hue, saturation, and brightness values. Affinity or distances between the key object (e.g., an object of interest in a given analysis) and other objects in the dataset are determined to group similar kind of objects in the dataset, detect outlier detection in the dataset and the like for data analysis. In one embodiment, the objects are sorted in a structured format (e.g., in an ascending order or a descending order). Further, a number of adjacent objects corresponding to the key object from the sorted plurality of objects are selected based on a specified number of nearest objects to be identified. The number of nearest objects to be identified is specified by a user based on how many objects have to be grouped as a cluster, for instance. Furthermore, distances between the key object and at least some of the selected number of adjacent objects are determined until the specified number of nearest objects is identified. Therefore, the distance of the key object under consideration to few adjacent objects are determined to identify nearest objects in the dataset. Since the method does not require the determination of the distances to every other object in the dataset, the complexity of determining distances is reduced and the process of identifying nearest objects is optimized.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
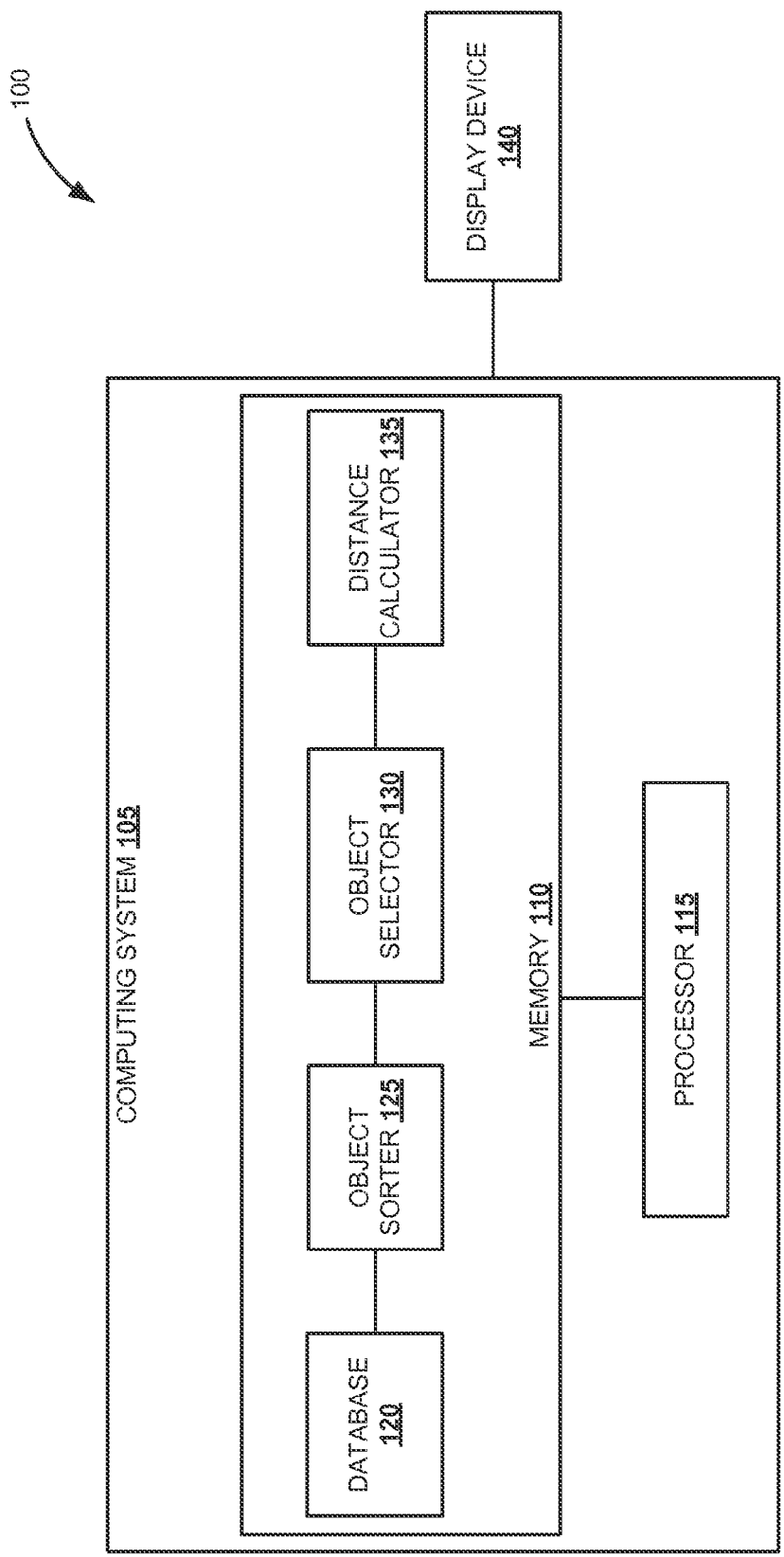
FIG. 1 illustrates a block diagram to identify nearest objects corresponding to a key object in a dataset, according to an embodiment.

FIG. 1 illustrates a block diagram 100 to identify the nearest objects corresponding to a key object in a dataset, according to an embodiment. The block diagram 100 includes a computing system 105 to identify nearest objects corresponding to the key object in the dataset. Further, the computing system 105 is connectively coupled to a display device 140 to display the identified nearest objects of the key object in the dataset for data analysis. Further, the computing system 105 includes a memory 110 and a processor 115 to execute instructions stored in the memory 110. Further, the memory 110 includes a database 120 to store the dataset associated an attribute. The dataset includes a plurality of objects. For example, the objects can be numbers representing numeral values of the attribute. The objects can be salary packages of employees, number of projects associated with each employee and the like, for instance. According to one embodiment, the nearest objects of the key object in the dataset are identified and presented on the display device 140 using an object sorter 125, an object selector 130 and a distance calculator 135. Further, a specified number of nearest objects, corresponding to the key object, to be identified is specified by a user.

In one embodiment, the object sorter 125 sorts the plurality of objects in a structured format. According to one embodiment, the structured format includes one of an ascending order and a descending order. Further, the object selector 130 selects a required number of adjacent objects corresponding to the key object (e.g., an object under consideration) from the sorted plurality of objects. In one exemplary embodiment, the required number of adjacent objects is selected based on a specified number of nearest objects to be identified. According to one embodiment, the number of adjacent objects includes twice the specified number of nearest objects to be identified. Since the objects are sorted in the structured format and the adjacent objects include twice the specified number of nearest objects to be identified, the selected adjacent objects will include the specified number of nearest objects corresponding to the key object. Therefore by determining the distances between the key object and the selected adjacent objects, the specified number of nearest objects can be identified rather than determining distances between the key object and every other object in the dataset. The advantage of selecting adjacent objects based on the specified number of nearest objects to be identified is described with an example in FIG. 2.

In one embodiment, the distance calculator 135 determines distances between the key object and at least some of the adjacent objects to identify the specified number of nearest objects most near to the key object. Further, the distances are determined until the specified number of nearest objects is identified. In other words, not all the distances between the key object and the adjacent objects are determined. Therefore, reducing the processing time of a computing system. The process of determining distances is explained in greater detail with examples in FIG. 3. Further, the identified nearest objects are used to analyze the dataset. For example, the nearest objects of the key object are grouped to form clusters and thus facilitate visualizing similar kinds of objects in the dataset. Further, patterns of objects in the dataset can be easily detected for outlier detecting using the identified nearest objects.

Figure 2:
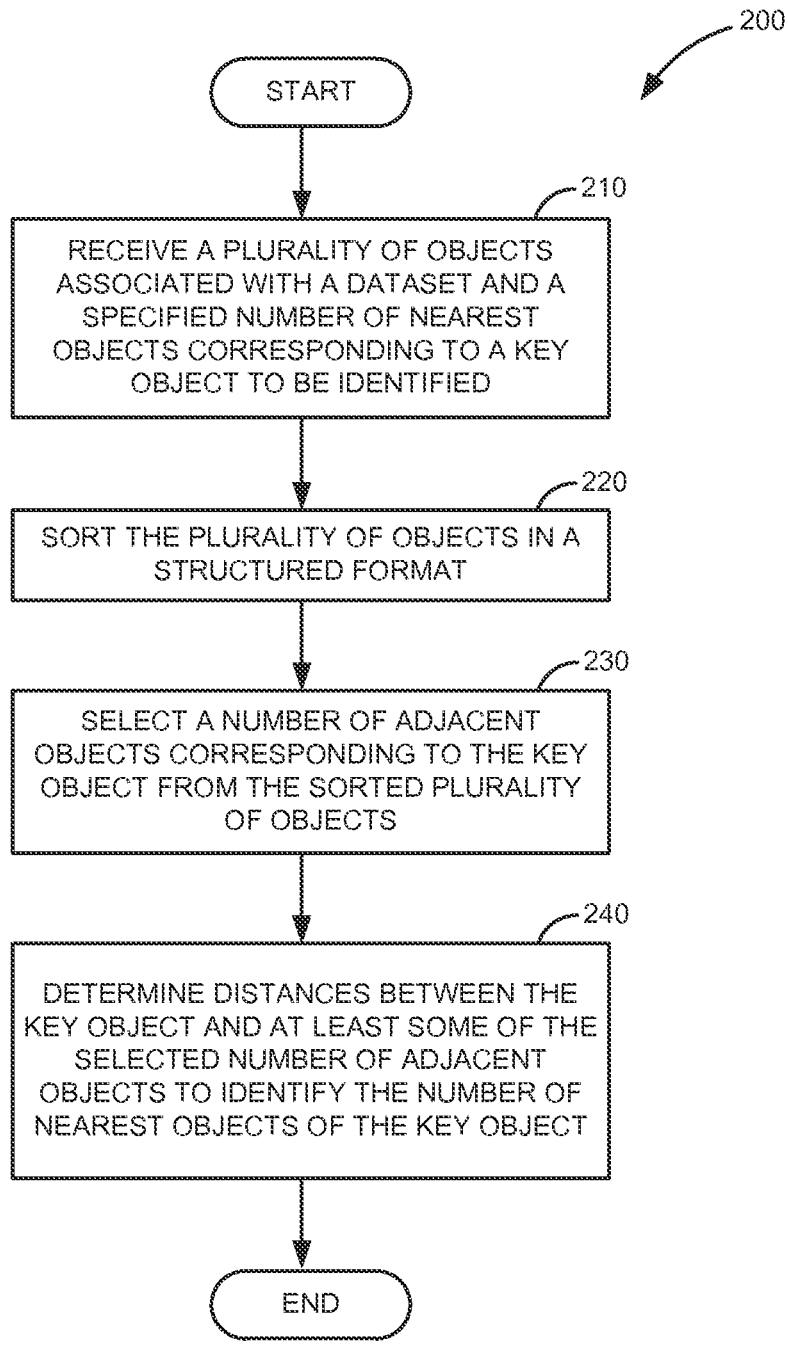
FIG. 2 is a flow diagram illustrating a method to identify nearest objects corresponding to a key object in a dataset, according to an embodiment.

FIG. 2 is a flow diagram 200 illustrating a method to identify nearest objects corresponding to a key object in a dataset, according to an embodiment. At step 210, a plurality of objects associated with the dataset and a specified number of nearest objects, corresponding to the key object, to be identified are received. For example, the objects may be numbers representing numeral values of the attribute such as salary package of employees in an organization, a number of projects associated with employees, tax deduction of the employees and the like. FIG. 4A depicts a dataset associated with the salary package of the employees. The dataset 400 includes 'n' number of objects (e.g. 178, 144, 184, 128). Further, the specified number of nearest objects to be identified is received as '5', for instance.

At step 220, the plurality of objects is sorted in a structured format. The structured format includes one of an ascending order and a descending order. In the example, the objects in the dataset are sorted in the ascending order as depicted in FIG. 4B. At step 230, a number of adjacent objects corresponding to the key object are selected from the sorted plurality of objects. The key object is an anchor object for which the nearest objects are identified. Each object in the dataset can be the key object. In the example, the object '144' 410 is considered as the key object. Further, the number of adjacent objects corresponding to the key object '144' 410 is selected. In one exemplary embodiment, the number of adjacent objects is selected based on the specified number of nearest objects to be identified. According to one embodiment, the number of adjacent objects includes twice the specified number of nearest objects to be identified. Further, the number of adjacent objects is selected from the structured format on both sides of the key object. For example in FIG. 4C, if '5' nearest objects corresponding to the key object '144' 410 are to be identified, '5' adjacent objects on both sides 420A and 420B (e.g., a total of '10' adjacent objects) are selected. Since the nearest object may fall on either side of the key object, a window including the key object and the number of adjacent objects on either sides of the key object is defined without calculating the distance of all the objects in the dataset from the key object.

Further, in the structured or ordered set of objects, an object '184' 415 cannot be in the 5 nearest objects of the key object '144' 410 as there are five other objects from the key object '144' 410 to the object '184' 415 in the dataset that falls between them. Similarly an object '111' 425 cannot be in the 5 nearest objects of the key object '144' 410. Therefore, the nearest objects corresponding to the key object '144' 410 exist in the defined window (e.g., 420A and 420B) and thus computation complexity of determining nearest objects corresponding to the key object is reduced.

At step 240, distances between the key object (e.g., '144' 410) and the number of adjacent objects (e.g., 420A and 420B) are determined to identify the specified number of nearest objects corresponding to the key object (e.g., '144' 410). In one embodiment, the distances are determined until the specified number of nearest objects is identified. In other words, not all the distances between the key object and the adjacent objects are determined, but the distances are determined until the specified number of nearest objects is identified. Further, the identified nearest objects are used for data analysis such as but not limited to, clustering of the objects and anomaly detection. The process of determining distances is explained in greater detail in FIG. 3.

Figure 3:
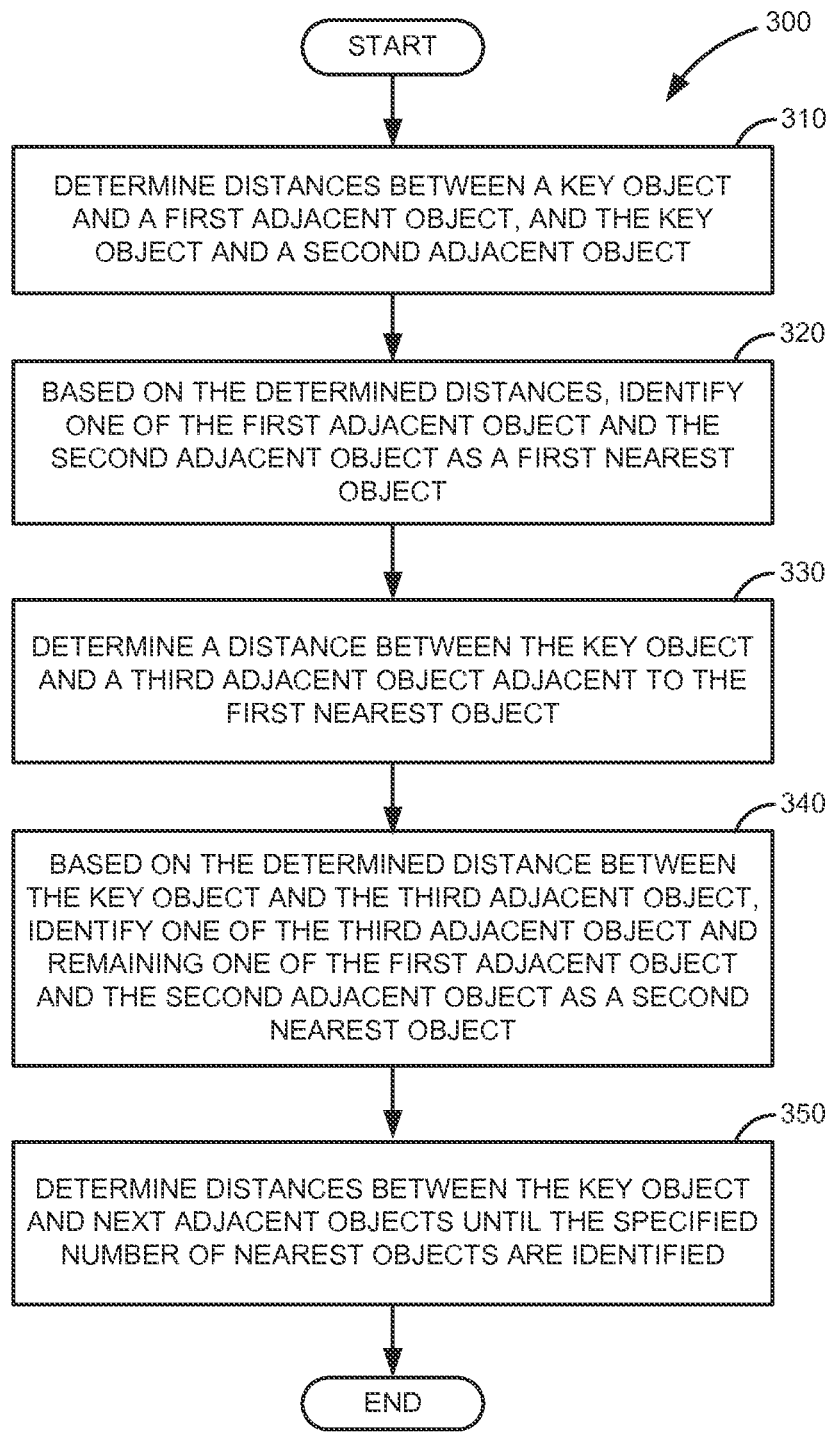
FIG. 3 is a flow diagram illustrating a method to identify nearest objects corresponding to a key object, according to an embodiment.

FIG. 3 is a flow diagram 300 illustrating a method to identify nearest objects corresponding to a key object, according to an embodiment. The distances between a key object (e.g., the position of the object currently considered, i.e., '144' 410 of FIG. 4C) and adjacent objects (e.g., 420A and 420B of FIG. 4C) are determined. At step 310, distances between a key object and a first adjacent object, and the key object and a second adjacent object are determined. In one exemplary embodiment, the first adjacent object is a successive object to the key object in the structured format of the dataset and the second adjacent object is a relative previous object to the key object in the structured format of the dataset. For example in FIG. 4D, the first adjacent object is '145' 430 and the second adjacent object is '138' 440 corresponding to the key object '144' 410. Therefore, the distances between the key object '144' 410 and first adjacent object '145' 430 and the key object '144' 410 and the second adjacent object '138' 440 are determined. There are different ways to compute distance between two objects. In some examples, where the objects include numerical values, the distance measure can change with dimensions of the object. In one dimension, the distance is an absolute value. Further, in two or more dimensions, denoting n dimensions, techniques such as but not limited to Euclidean distance, weighted Euclidean distance and Manhattan distance may be used to determine distance between two objects. In some examples, where the objects include non-numerical values other distance measures are needed. In one embodiment, the nature of the values will determine the distance measure. For example, if the values are strings the distance measure could be selected from the group including Edit Distance, Hamming Distance, and the like.

In the example, the distance between the two objects is determined using the Euclidean distance as shown in equation (1).

$$d(p,q) = \sqrt{(p-q)^2} \quad (1)$$

Wherein,
d=distance
p and q=objects in the dataset

Therefore, the distance (d) between the key object '144' 410 (p) and first adjacent object '145' 430 (q) is determined as shown in Equation (2).

$$d(410,430) = \sqrt{(144-145)^2} = 1 \quad (2)$$

The distance (d) between the key object '144' 410 (p) and second adjacent object '138' 440 (q) is determined as shown in Equation (3).

$$d(410,440) = \sqrt{(144-138)^2} = 6 \quad (3)$$

At step 320, based on the determined distances, one of the first adjacent object and the second adjacent object is identified as a first nearest object. In one exemplary embodiment, the first adjacent object is identified as the first nearest object, when the distance between the key object and the first adjacent object is less than or same as the distance between the key object and the second adjacent object. On the other hand, the second adjacent object is identified as the first nearest object, when the distance between the key object and the first adjacent object is greater than the distance between the key object and the second adjacent object. In the example, the distance between the key object '144' 410 and the first adjacent object '145' 430 (e.g., 1) is less than the distance between the key object '144' 410 and the second adjacent object '138' 440 (e.g., 6). Therefore, the first adjacent object '145' 430 is identified as the first nearest object.

At step 330, a distance between the key object and a third adjacent object adjacent to the first nearest object is determined. In the example, the third adjacent object is '148' 450, which is adjacent to the first nearest object '145' 430. The distance (d) between the key object '144' 410 (p) and third adjacent object '148' 450 (q) is determined as shown in Equation (4).

$$d(410,450) = \sqrt{(144-148)^2} = 4 \quad (4)$$

At step 340, based on the determined distance, one of the third adjacent object and remaining one of the first adjacent object and the second adjacent object is identified as a second nearest object. In the example, the distance between the key object '144' 410 and the third adjacent object is '148' 450 (e.g., 4) is less than the distance between the key object '144' 410 and the second adjacent object '138' 440 (e.g. 6). Therefore, the third adjacent object '148' 450 is identified as the second nearest object.

At step 350, distances between the key object and next adjacent objects are determined to identify next nearest objects until the specified number of nearest objects are identified. For example, the distances between the key object and the next adjacent objects are determined until the specified number of nearest objects (e.g., 5) is identified.

In the example, to determine a third nearest object, the distance (d) between the key object '144' 410 (p) and a fourth adjacent object '152' 460 (q) adjacent to the second nearest object '148' 450 is determined as shown in Equation (5).

$$d(410,460) = \sqrt{(144-152)^2} = 8 \quad (5)$$

Further, the distance between the key object '144' 410 and the fourth adjacent object is '152' 460 (e.g., 8) is greater than the distance between the key object '144' 410 and the second adjacent object '138' 440 (e.g., 6). Therefore, the second adjacent object '138' 440 is identified as the third nearest object. Till now three nearest objects are identified from the first four adjacent objects. Similarly all the five nearest objects can be found by just evaluating only one more extra object from the defined window.

In the example, to determine a fourth nearest object, the distance (d) between the key object '144' 410 (p) and a fifth adjacent object '133' 470 (q) adjacent to the third nearest object '138' 440 is determined as shown in Equation (6).

$$d(410,470) = \sqrt{(144-133)^2} = 11 \quad (6)$$

The distance between the key object '144' 410 and the fifth adjacent object is '133' 470 (e.g., 11) is greater than the distance between the key object '144' 410 and the fourth adjacent object is '152' 460 (e.g., 8). Therefore, the fourth adjacent object '152' 460 is identified as the fourth nearest object.

Similarly, to determine a fifth nearest object, the distance (d) between the key object '144' 410 (p) and a sixth adjacent object '171' 480 (q) adjacent to the fourth nearest object '152' 460 is determined as shown in Equation (7).

$$d(410,480) = \sqrt{(144-171)^2} = 21 \quad (7)$$

Further, the distance between the key object '144' 410 and the sixth adjacent object is '171' 480 (e.g., 27) is greater than the distance between the key object '144' 410 and the fifth adjacent object is '133' 470 (e.g., 11). Therefore, the fifth adjacent object '133' 470 is identified as the fifth nearest object. At this step, determining the distances is stopped as the specified number of nearest objects (e.g., 5) is identified. Therefore the determining distances in the data set is reduced from 2K (i.e., 2K is the twice the specified number of nearest objects to be identified, i.e., adjacent objects) to K+1.

In one embodiment, the Euclidean distance to the adjacent objects immediately on both the sides of the key object is determined. Further by comparing the determined distances, the lowest value is identified to be one of the nearest objects. In one exemplary embodiment, for adjacent objects which are equal to some adjacent objects that have been considered already for calculations, the distance calculation for such adjacent objects is avoided. In other words, a check is made to determine whether the adjacent object is analogous to a previous object (e.g., object that is considered already for calculations). Further, when the adjacent object is analogous to the previous object, the distance between the key object and the next adjacent object is considered same as the distance between the key object and the previous object. Thereby while picking the objects for consideration a check is performed for a similar object has been already considered and when considered, the distance value for this object also will be updated and thus not considered again for calculations. In another exemplary embodiment, if the defined window includes no objects (e.g., when a first object in the dataset is considered as the key object), adjacent objects on one side of the first object are considered as null objects. Therefore, the complexity of identifying nearest objects is reduced as the process of identifying the nearest objects is optimized and thereby improving performance.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
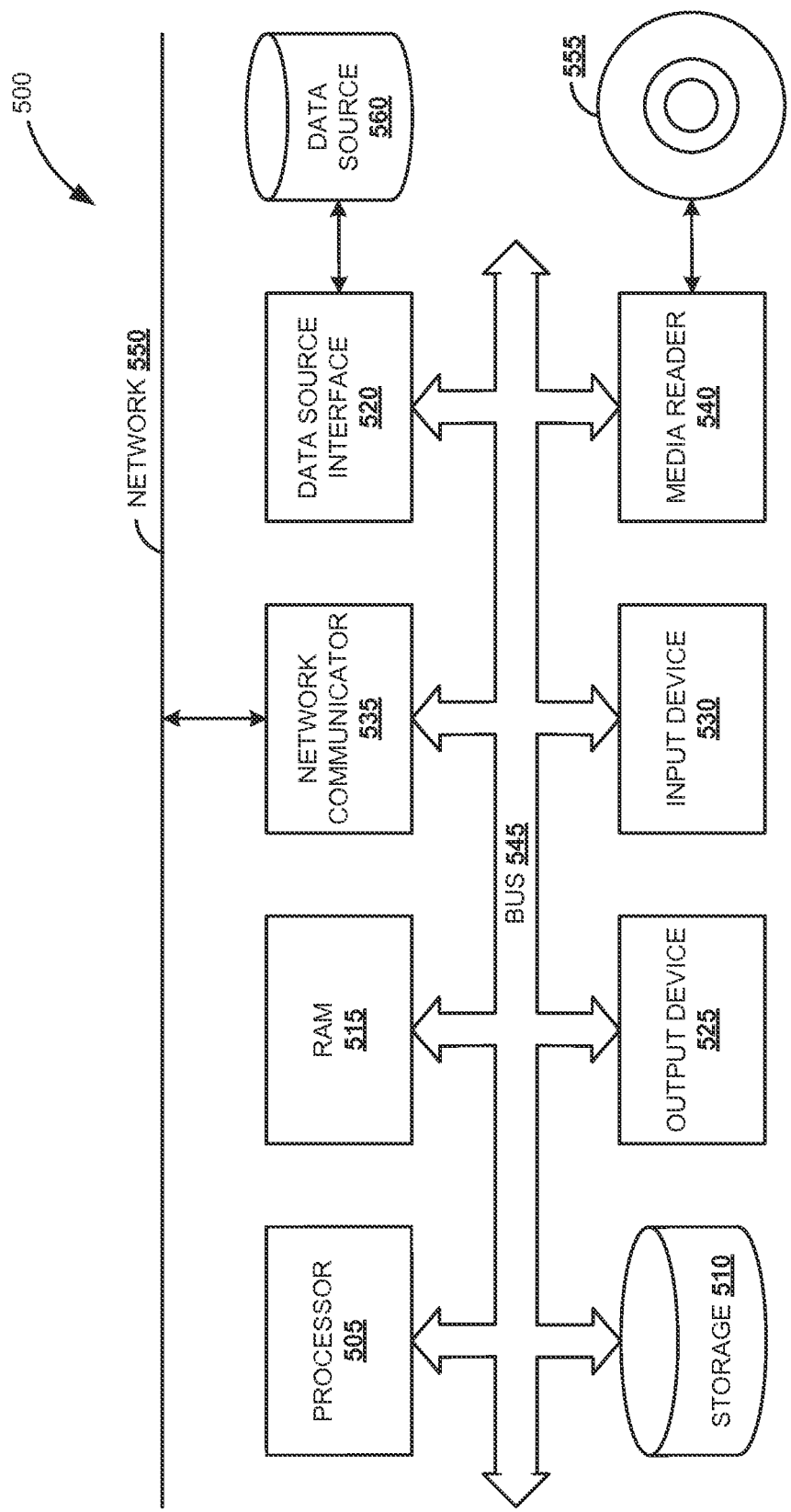
FIG. 5 is a block diagram of an exemplary computer system, according to an embodiment.

FIG. 5 is a block diagram of an exemplary computer system 500, according to an embodiment. The computer system 500 includes a processor 505 that executes software instructions or code stored on a computer readable storage medium 555 to perform the above-illustrated methods. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g. OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to store instructions, which when executed by a computer, cause the computer to:
   receive a selection of a plurality of objects associated with a dataset, a key object and a specified number of nearest objects corresponding to the selected key object;
   sort the plurality of objects in a structured format, wherein the sorted plurality of objects is adjacent to the key object;
   define one or more windows including a subset of the sorted plurality of objects, wherein a cardinality of the subset corresponds to the specified number of nearest objects; and
   determine distances between the key object and the sorted plurality of objects based on the defined one or more windows to identify one or more nearest objects for data analysis, wherein identifying the one or more nearest objects to the key object, comprises:
     determining a first distance between the key object and a first object adjacent to the key object, and a second distance between the key object and a second object adjacent to the key object;
     based on the determined first distance and the determined second distance, identifying one of the first object and the second object adjacent to the key object as a first nearest object;
     determining a distance between the key object and a third object adjacent to the first nearest object; and
     based on the determined distance between the key object and the third object, identify one of the third object and remaining of the first object and the second object adjacent to the key object as a second nearest object.

2. The article of manufacture of claim 1, wherein the structured format of the plurality of objects comprises the plurality of objects sorted in one of an ascending order and a descending order.

3. The article of manufacture of claim 1, wherein the plurality of objects adjacent to the key object is at least twice the specified number of nearest objects, and the plurality of objects adjacent to the key object is selected from the structured format of the plurality of objects on both sides of the key object.

4. The article of manufacture of claim 1, wherein the first nearest object is a successive object to the key object in the structured format of the plurality of objects and the second nearest object is a previous object to the key object in the structured format of the dataset.

5. The article of manufacture of claim 1, wherein determining the first and second distances between the key object and the plurality of objects in the defined one or more windows, further comprises:
   determining whether a next adjacent object is analogous to a previous object; and
   when the next adjacent object is analogous to the previous object, determining that the distance between the key object and the next adjacent object is same as the distance between the key object and the previous object.

6. A computer implemented method to identify nearest objects corresponding to a key object in a dataset, the method comprising:
   receiving a selection of a plurality of objects associated with the dataset, a key object and the specified number of nearest objects corresponding to the selected key object;
   sorting the plurality of objects in a structured format, wherein the sorted plurality of objects is adjacent to the key object;
   defining one or more windows including a subset of the sorted plurality of objects, wherein a cardinality of the subset corresponds to the specified number of nearest objects; and
   a processor of the computer, determining the distance between the key object and the sorted plurality of objects defined based on the one or more windows to identify one or more nearest objects for data analysis, wherein identifying the one or more nearest objects to the key object, comprises:
     determining a first distance between the key object and a first object adjacent to the key object, and a second distance between the key object and a second object adjacent to the key object;
     based on the determined first distance and the determined second distance, identifying one of the first object and the second object adjacent to the key object as a first nearest object;
     determining a distance between the key object and a third object adjacent to the first nearest object; and
     based on the determined distance between the key object and the third object, identify one of the third object and remaining of the first object and the second object adjacent to the key object as a second nearest object.

7. The computer implemented method of claim 6, wherein the structured format of the plurality of objects comprises the plurality of objects sorted in one of an ascending order and a descending order.

8. The computer implemented method of claim 6, wherein the plurality of objects adjacent to the key object is at least twice the specified number of nearest objects, and the plurality of objects adjacent to the key object is selected from the structured format of the plurality of objects on both sides of the key object.

9. The computer implemented method of claim 6, wherein the first nearest object is a successive object to the key object in the structured format of the plurality of objects and the second nearest object is a previous object to the key object in the structured format of the dataset.

10. The computer implemented method of claim 6, wherein determining the first and second distances between the key object and the plurality of objects in the defined one or more windows, further comprises:
    determining whether a next adjacent object is analogous to a previous object; and
    when the next adjacent object is analogous to the previous object, determining that the distance between the key object and the next adjacent object is same as the distance between the key object and the previous object.

11. A computer system to identify nearest objects corresponding to a key object in a dataset, the computer system comprising:
    at least one processor; and
    one or more memory devices communicatively coupled with the at least one processor and storing instructions related to:
      receiving a selection of a plurality of objects associated with the dataset, a key object and the specified number of nearest objects corresponding to the selected key object;
      sorting the plurality of objects in a structured format, wherein the sorted plurality of objects is adjacent to the key object;

defining one or more windows including a subset of the sorted plurality of objects, wherein a cardinality of the subset corresponds to the specified number of objects; and determining the distance between the key object and the sorted plurality of objects defined based on the one or more windows to identify one or more nearest objects for data analysis, wherein identifying the one or more nearest objects to the key object, comprises:

determining a first distance between the key object and a first object adjacent to the key object, and a second distance between the key object and a second object adjacent to the key object;

based on the determined first distance and the determined second distance, identifying one of the first object and the second object adjacent to the key object as a first nearest object;

determining a distance between the key object and a third object adjacent to the first nearest object; and based on the determined distance between the key object and the third object, identify one of the third object and remaining of the first object and the second object adjacent to the key object as a second nearest object.

12. The computer system of claim 11, wherein the plurality of objects adjacent to the key object is at least twice the specified number of nearest objects and the plurality of objects adjacent to the key object is selected from the structured format of the plurality of objects on both sides of the key object.

13. The computer system of claim 11, wherein the structured format of the plurality of objects comprises the plurality of objects sorted in one of an ascending order and a descending order.

14. The computer system of claim 11, wherein the first nearest object is a successive object to the key object in the structured format of the plurality of objects and the second nearest object is a previous object to the key object in the structured format of the dataset.

* * * * *